Patented Oct. 13, 1931

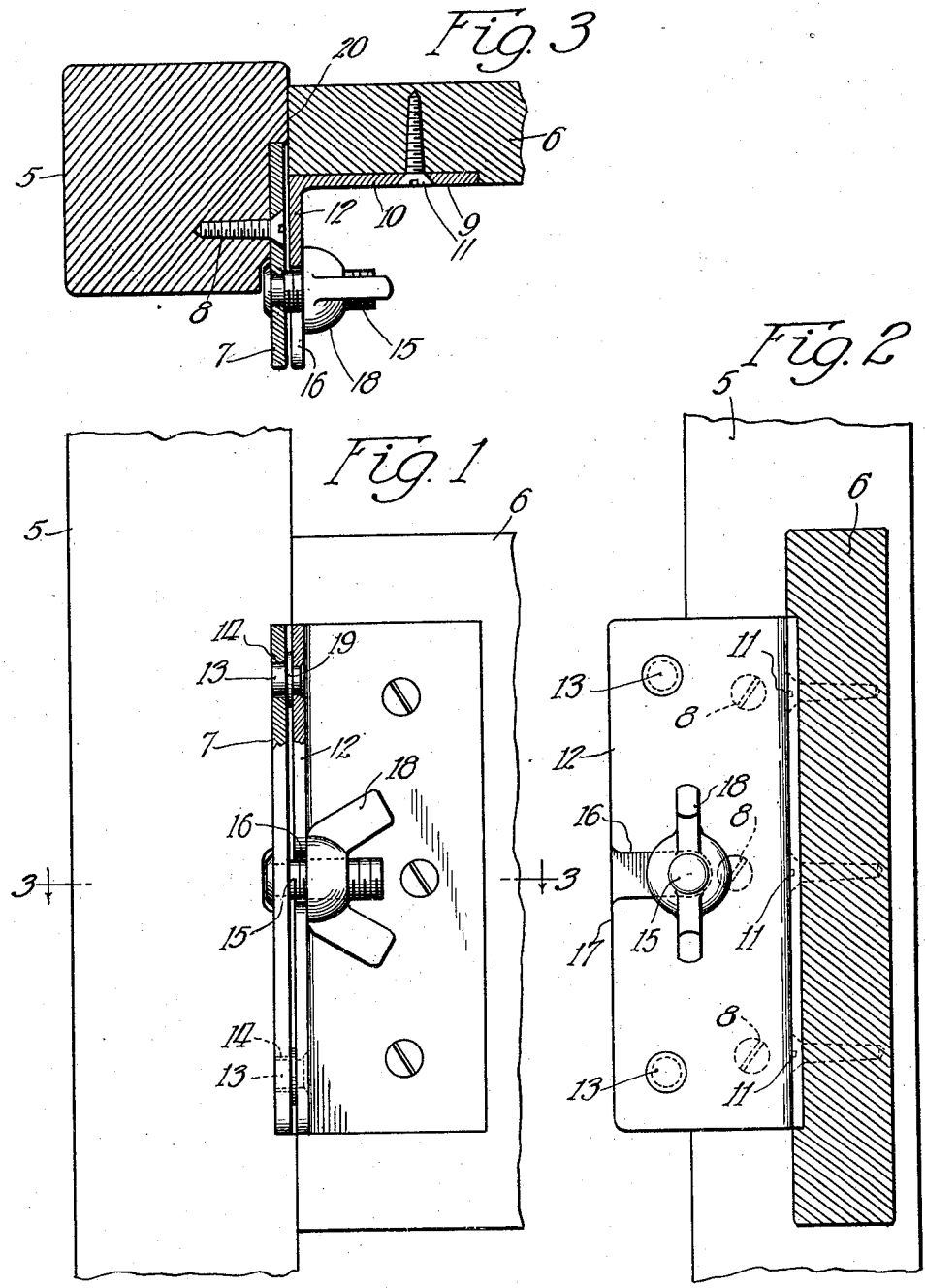

1,827,330

UNITED STATES PATENT OFFICE

WILLIAM H. PARRY, SR., OF KENOSHA, WISCONSIN, ASSIGNOR TO SIMMONS COMPANY, OF KENOSHA, WISCONSIN, A CORPORATION OF WISCONSIN

SIDE RAIL LOCK FOR BEDSTEADS AND THE LIKE

Application filed July 8, 1929. Serial No. 376,711.

This invention relates to bedstead construction and more particularly to an improved means for detachably connecting the side rail of a bedstead to one of the end frames thereof.

The principal objects of the invention are to provide a comparatively simple and inexpensive side rail lock; to provide a side rail lock which is readily engageable or disengageable as desired, while at the same time affording a firm and rigid connection between the parts; and to provide a structure which will not readily become disengaged by accident, and in general, it is the object of my invention to provide an improved side rail lock such as above referred to.

Other objects and advantages of my invention will be understood by reference to the following specification and accompanying drawings in which I have described and illustrated a side rail lock embodying a selected form of my invention.

In the drawings:

Fig. 1 is an elevation looking at the inside of a side rail and its connection to a bedstead end frame corner post.

Fig. 2 is also an elevation of the inside of the side rail lock, looking towards the end frame, and Fig. 3 is a section on the line 3—3 of Fig. 1.

Referring now to the drawings, I have shown a corner post 5 and a side rail 6 which constitute parts of a bedstead construction, the corner post 5 being preferably a part of an end frame in accordance with well known practice.

My improved connection between the side rail and corner post or end frame includes a bracket or flange plate 7 which is secured to the corner post by suitable means such as one or more screws 8. The bracket plate 7 is preferably recessed in the corner post as indicated in Fig. 3. Another bracket, which may consist of a simple angle iron member, is secured to the side rail 6. One flange 10 of the bracket is seated against and secured to the inside face of the side rail and preferably in a recess provided therein, by suitable means such as screws 11. The other leg or flange 12 of the bracket 9 extends laterally inwardly from the side rail and overlaps the bracket plate or flange 7, the flanges 7 and 12 being thus disposed substantially face to face as clearly shown in Figs. 1 and 3.

For positioning the side rail with respect to the corner post or end frame, I provide the flanges 7 or 12 with interfitting means. In the present instance, the interfitting means consists of a pair of vertically spaced dowel pins 13 which are anchored to the flange 12 by riveting or otherwise, and which project outwardly from the flange and fit into suitable openings 14 provided in the flange 7. The interfitting dowel pins and openings serve to interlock the flanges 7 and 12 against sidewise or edgewise displacement relative to each other while being engageable or disengageable by relative lateral movement between the flanges or endwise movement of the side rail relative to the end frame.

For locking the flanges together so as to prevent lateral separation thereof, I provide a screw 15 which is anchored to the flange 7, in any suitable manner, for instance, by means of a reduced end portion fitting in an opening in the flange 7 and headed over as best shown in Fig. 3. The side rail flange 12 is provided with a notch or cut out portion 16 which opens to the inner edge 17 of the flange 12 and receives the screw 15. The wing nut 18 fitting the screw 15 serves to clamp the flanges together as will be readily understood by inspection of Fig. 1. The side rail is thus detachably secured to the corner post, it being removable from the corner post by first loosening the nut 18, separating flanges 7 and 12 so as to withdraw the dowel pins 13 from their openings in the flange 7, and then moving the side rail laterally outwardly so as to withdraw the bracket 12 from its position around the screw 15 and under the nut.

In the present instance, the dowel pins 13 are each provided with a shoulder 19 which serves to space the flanges 7 and 12 slightly so that they do not have actual face to face contact. One or both of the flanges 7 and 12, but preferably the flange 12, is sufficiently resilient to yield under the pressure of the clamping nut 18 whereby the nut is frictionally held against unscrewing, and accidental unlocking of the connection is thereby effectively prevented. As clearly shown in Fig. 2, the clamping device is located to one side of the plane of vertical alignment of the inter-connecting dowels. By so locating the clamping device, the spacing shoulders 19 on the respective dowels serve as fulcrum points about which the clamping device tends to rock the flange 12 horizontally relative to the flange 7, thereby effecting tight engagement between the end of the side rail 6 and the adjacent face of the corner post 5.

It will be seen that the above described connection is effective to lock the side rail 6 to the corner post 5 with the end 20 of the side rail in tight engagement with the adjacent face of the corner post. The clamping nut, being a wing nut, affords, in effect, a lever arm arrangement whereby the nut is manually releasable or engageable in spite of the resistance to its adjustment due to the resiliency and yielding of the bracket flange 12.

Obviously, the described connecting means may be effectively mounted without recessing either of the bracket parts, it being merely necessary to cause the end 20 of the side rail to project beyond the flange 12 a distance substantially equal to the combined thickness of the bracket plate 7 and the width of the space between the flanges 7 and 12. Other changes and re-arrangements of the above described structure may also be made without departing from the spirit of my invention, the scope of which should be determined by reference to the following claims, construing the same as broadly as possible consistent with the state of the art.

I claim as my invention:

1. In a bedstead, the combination of an end frame, a side rail, and means for detachably connecting said end frame and side rail comprising a bracket carried by said end frame, a bracket carried by said side rail, said brackets having mutually overlapping flange portions, and being provided with spaced, interfitting dowel means for relatively positioning the parts, shoulders on said dowel means for maintaining said flanges in spaced relation to each other, and clamping means intermediate said dowel means for locking said flanges together, one of said flanges being sufficiently resilient to yield under the pressure of said clamping means, the resiliency of said part serving to maintain said clamping means in operative position.

2. In a bedstead, the combination of an end frame, a side rail normally disposed with one end abutting said end frame, and means for detachably connecting said parts comprising a pair of brackets respectively carried by said end frame and side rail, said brackets extending inwardly from said side rail and including mutually overlapping parts provided with means for spacing the same apart adjacent their inner edges, said brackets being also provided with means for interlocking the same in predetermined relative position, and means spaced outwardly from said spacing means for clamping said parts together, said clamping means serving, in effect, to rock said parts relative to each other about said spacing means as a fulcrum, thereby to effect tight engagement between the end of said side rail and said end frame.

3. In a bedstead, the combination of an end frame, a side rail normally having one end abutting said end frame, and means for detachably connecting said end frame and side rail comprising a bracket carried by said end frame, a bracket carried by said side rail, said brackets having mutually overlapping flange portions and being provided with spaced, inter-fitting dowel means adjacent their inner edges, said dowel means serving to position said flanges relative to each other and being provided with shoulders for spacing the flanges apart adjacent said inner edges, and clamping means intermediate said dowel means and disposed outwardly thereof for locking said flanges together, said clamping means tending to rock said flanges toward each other about said spacing shoulders as fulcrum points, thereby to effect tight engagement of the end of said side rail with said end frame.

WILLIAM H. PARRY, Sr.